United States Patent
Cavallini

(10) Patent No.: US 8,933,635 B2
(45) Date of Patent: Jan. 13, 2015

(54) METHOD OF PREVENTING SPURIOUS RINGING DURING DISCONTINUOUS CONDUCTION MODE IN INDUCTIVE BOOST CONVERTERS FOR WHITE LED DRIVERS

(75) Inventor: Pier Cavallini, Swindon (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 124 days.

(21) Appl. No.: 13/443,914

(22) Filed: Apr. 11, 2012

(65) Prior Publication Data
US 2013/0264953 A1 Oct. 10, 2013

(30) Foreign Application Priority Data
Apr. 6, 2012 (EP) .................................. 12368008

(51) Int. Cl.
*H05B 37/00* (2006.01)
(52) U.S. Cl.
USPC ........................... 315/186; 315/189; 315/193
(58) Field of Classification Search
USPC .............. 315/119, 209 R, 219, 224, 247, 307
See application file for complete search history.

(56) References Cited

U.S. PATENT DOCUMENTS

| | | | |
|---|---|---|---|
| 5,550,458 A | 8/1996 | Farrington et al. | |
| 5,751,139 A | 5/1998 | Jordan et al. | |
| 7,508,174 B2 | 3/2009 | Wei et al. | |
| 7,633,275 B2 | 12/2009 | Leyk et al. | |
| 7,915,876 B2 | 3/2011 | Orr | |
| 2005/0035729 A1* | 2/2005 | Lev et al. | 315/291 |
| 2005/0151518 A1 | 7/2005 | Schneiker et al. | |
| 2008/0111504 A1* | 5/2008 | Liu | 315/308 |
| 2008/0252273 A1 | 10/2008 | Woo et al. | |
| 2009/0010035 A1 | 1/2009 | Williams | |
| 2009/0027027 A1* | 1/2009 | Lin et al. | 323/285 |
| 2009/0315481 A1* | 12/2009 | Zhao | 315/297 |
| 2010/0207536 A1* | 8/2010 | Burdalski et al. | 315/224 |
| 2010/0295472 A1* | 11/2010 | Wibben et al. | 315/294 |
| 2010/0308733 A1* | 12/2010 | Shao | 315/119 |
| 2011/0101877 A1* | 5/2011 | Zhan et al. | 315/206 |
| 2011/0169416 A1* | 7/2011 | Hsieh | 315/219 |
| 2012/0306403 A1* | 12/2012 | Chung et al. | 315/291 |

OTHER PUBLICATIONS

Co-pending US Patent DS11-032, U.S. Appl. No. 13/441,070, filed Apr. 6, 2012, "Method for Optimizing Efficiency Versus Load Current in an Inductive Boost Converter for White LED Driving," by Pier Cavallini et al., 34 pgs.

* cited by examiner

*Primary Examiner* — Thienvu Tran
*Assistant Examiner* — Christopher Lo
(74) *Attorney, Agent, or Firm* — Saile Ackerman LLC; Stephen B. Ackerman

(57) ABSTRACT

Circuits and methods prevent ringing of white LED drivers by adding a high voltage coil switch (CS) circuit, a high voltage edge detector circuit, and a boot strap circuit. The coil switch (CS) circuit to short the coil of a boost converter, when the current in it reaches zero during DCM, comprises a series of 2 identical HV enhancement NMOS with bulk switch system. An Edge Detector circuit senses the fast falling edge of an LX node. A Boost Strap circuit lifts the gate of coil switch circuit above the battery voltage level and turns on the coil switch. A Boost Strap (BS) system lifts the gate of CS above the VBAT level and turns on CS, wherein minimum current is required to minimize impact on efficiency.

15 Claims, 6 Drawing Sheets

METHOD OF PREVENTING SPURIOUS RINGING DURING DISCONTINUOUS CONDUCTION MODE IN INDUCTIVE BOOST CONVERTERS FOR WHITE LED DRIVERS

RELATED APPLICATION

This application is related to the following US patent application titled "Method for Optimizing Efficiency versus Load Current in an Inductive Boost Converter for White LED Driving", U.S. application Ser. No. 13/441,070, filed Apr. 6, 2012, which is incorporated by reference in their entirety and is assigned to a common assignee as the instant application.

BACKGROUND (1) Technical Field

This disclosure relates generally to the field of white LED drivers and relates more specifically to white LED drivers preventing ringing in Discontinuous Conduction Mode.

(2) Background

White light emitting diodes (WLED) are used most often in notebooks and desktop screens, and in virtually all mobile LCD screens. A WLED is typically a blue LED with broad-spectrum yellow phosphor to give the impression of white light. WLEDs are often used for backlighting LCD displays. For such an application WLED drivers have to generate constant current required for a constant luminance.

Inductive boost converters are often used as WLED drivers, generating high bias voltages from a single low-voltage supply, such as a battery. Ringing of the current in the coil of the inductive boost converter caused by parasitic charging and discharging of the switching node LX results in EMI radiation and input/output noise by parasitic coupling.

A common solution is to introduce a switch across the coil to virtually dump the oscillations when ringing occurs, while it remains open when the power switch is on. This represents a certain level of complication for the integrated technology in use for such WLED boost converter.

Therefore it is a challenge for engineers designing high voltage WLED drivers to find a simple solution for the ringing problem and to keep the system efficient.

SUMMARY

A principal object of the present disclosure as to prevent ringing of an inductive WLED driver.

A further object of the disclosure is to introduce a high-voltage (HV) coil switch to short the coil of a boost converter when the current in the coil reaches zero during Discontinuous Conduction Modes (DCM).

A further object of the disclosure is to introduce a high-voltage Edge detector to sense) to sense the fast falling edge of the LX node.

A further object of the disclosure is to introduce a Boost Strap system to lift the gate of high-voltage coil switch above the VBAT level and turn on high-voltage coil switch.

A further object of the disclosure is to minimize DC current required to operate to minimize impacts on efficiency of the WLED driver.

A further object of the disclosure is to achieve a HV solution suitable for WLED boost converters regulating at high voltages.

A further object of the disclosure is to use of NMOS enhancement devices with bulk switch allowing simpler bulk switching method and better trade off On-resistance vs. silicon area in respect of a PMOS solution.

In accordance with the objects of this disclosure a method to prevent ringing in Discontinuous Conduction Mode (DCM) of a boost converter for a white LED driver has been achieved. The method disclosed comprises the following steps: (1) providing a high-voltage WLED asynchronous boost converter, driving one or more WLEDs connected in series, wherein the boost converter comprises a port for an input voltage, an inductor, a diode, a power switch, wherein the inductor, the diode, and the power switch are all connected to a LX node, (2) sensing a fast falling edge of the voltage at the LX node in order to immediately initiate shorting the inductor if required, (3) shorting the inductor when the current through the inductor reaches zero during DCM mode by a coil switch across the inductor, and (4) turning on the switch, if required, by lifting the gate of the switch above the input voltage level.

In accordance with the objects of this disclosure a circuit to prevent ringing in Discontinuous Conduction Mode (DCM) of a boost converter for a white LED driver has been achieved. The circuit disclosed comprises, firstly, a boost converter comprising: a port for an input voltage, an inductor connected between a first terminal of the port for the input voltage and a node LX, wherein a high voltage coil switch circuit is shorting the inductor when a current through the inductor reaches zero during DCM mode, and said high voltage switch circuit being controlled by a boot strap circuit. Furthermore the boost converter comprises a high voltage edge detector sensing a fast falling edge of the voltage at a LX node in order to immediately initiate shorting the inductor via a boot strap circuit, if required, wherein the LX node connects a second terminal of the inductor, a first rectifying means, and a power switch, and wherein the edge detector is connected via a first and a second connection to the boot strap circuit, said boot strap circuit to lift a gate of the high voltage switch circuit above a level of the input voltage and to turn on the coil switch, and said first rectifying means connected between the node LX and an output voltage of the boost converter. Moreover the boost converter comprises a first capacitive means connected between output ports of the boost converter, said power switch connected between the node LX and VSS voltage, wherein the power switch is controlled by output signals of a PWM control unit, and said PWM control units receiving inputs from a clock signal generator and from a voltage level from a node, connected between a second terminal of a programmable current source and a second terminal of one or more white LEDs connected in series. Furthermore the system comprises said one or more white LEDs, wherein a first terminal of the one or more white LEDs is connected to a first output port of the boost converter, and said programmable current source to deliver a bias current to the one or more white LEDs, wherein a first terminal of the current source is connected to VSS voltage.

In accordance with the objects of this disclosure a method to optimize efficiency and to prevent ringing in Discontinuous Conduction Mode (DCM) of a boost converter for a white LED driver has been achieved. The method disclosed, comprises the following steps: (1) providing a device comprising an arrangement of one or more white LEDs in series, a programmable iDAC current source, a high-voltage WLED asynchronous boost converter, driving the one or more WLEDs, wherein the boost converter comprises a port for an input voltage, an inductor, a diode, a power switch, and a programmable reference voltage generator for an error amplifier stage, wherein the inductor, the diode, and the power switch are all connected to a LX node, and (2) sensing a fast falling edge of the voltage at the LX node in order to immediately initiate shorting the inductor if required. Furthermore the method disclosed the steps of: (3) shorting the inductor when the current through the inductor reaches zero during DCM mode by a coil switch across the inductor and (4) turning on the switch, if required, by lifting the gate of the switch above the input voltage level.

In accordance with the objects of this disclosure a circuit to prevent ringing in Discontinuous Conduction Mode (DCM) of a boost converter for a white LED driver has been achieved. The circuit disclosed comprises, firstly, a boost converter comprising: a port for an input voltage, an inductor connected between a first terminal of the port for the input voltage and a node LX, wherein a high voltage coil switch circuit is shorting the inductor when a current through the inductor reaches zero during DCM mode, and said high voltage switch circuit being controlled by a boot strap circuit. Furthermore the boost converter comprises a high voltage edge detector sensing a fast falling edge of the voltage at a LX node in order to immediately initiate shorting the inductor via a boot strap circuit, if required, wherein the LX node connects a second terminal of the inductor, a first rectifying means, and a power switch, and wherein the edge detector is connected via a first and a second connection to the boot strap circuit, said boot strap circuit to lift a gate of the high voltage switch circuit above a level of the input voltage and to turn on the coil switch, and a rectifying means connected between the node LX and an output voltage of the boost converter. Moreover the boost converter comprises a capacitor connected between output ports of the boost converter, said power switch connected between the node LX and a second terminal of a sense resistor, wherein the power switch is controlled by a signal from a regulation loop, said sense resistor, wherein a second terminal of the sense resistor is connected to a second terminal of said port for the input voltage, and said regulation loop connected between a second terminal of a programmable current source and a gate of said power switch. Finally the circuit comprises said one or more white LEDs connected in series wherein a first terminal of the one or more white LEDs is connected to a first output port of the boost converter and a second terminal of the one or more white. LEDs is connected to the second terminal of the programmable current source, and said programmable current source to deliver a bias current to the one or more white LEDs, wherein a second terminal of the current source is connected to the second terminal of said port for the input voltage.

BRIEF DESCRIPTION OF THE DRAWINGS

In the accompanying drawings forming a material part of this description, there is shown.

DESCRIPTION OF THE PREFERRED EMBODIMENTS

Methods and circuits for driving white LEDs (WLED) are disclosed. In a preferred embodiment a string of WLEDS is powered by the driver, e.g. for backlighting a display. LCD.

Figure 1:
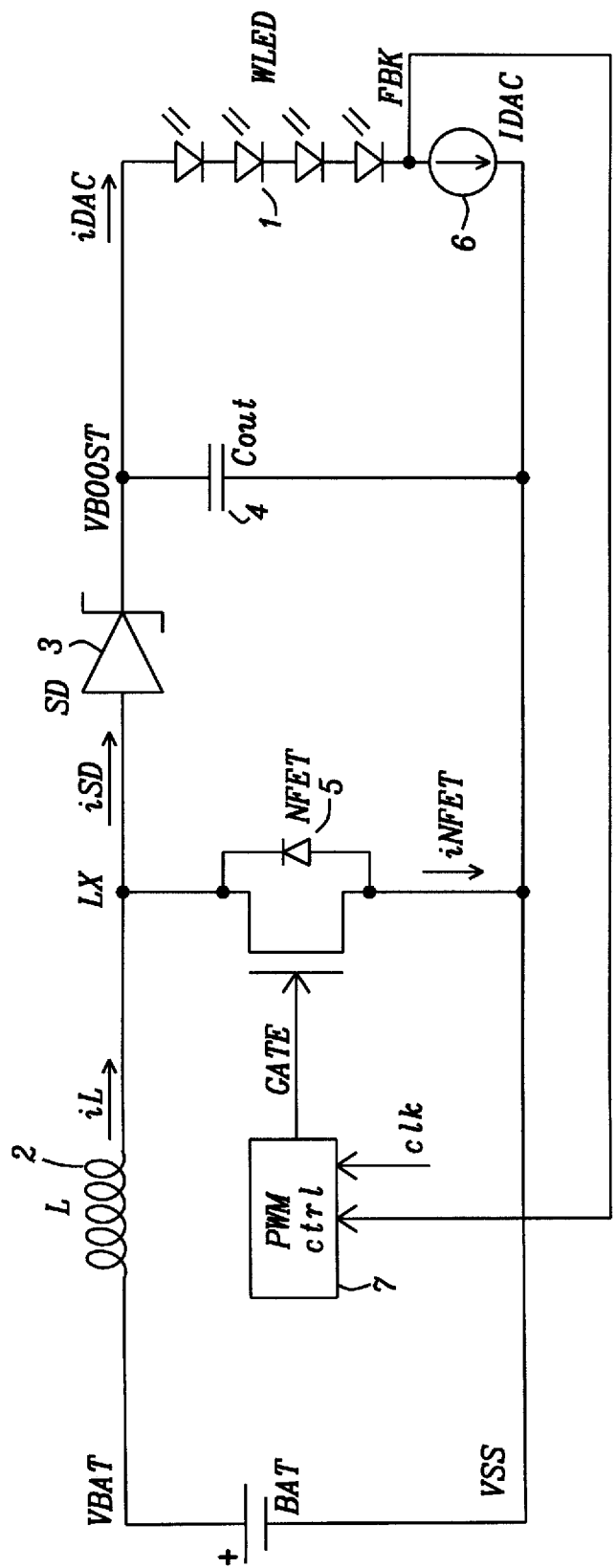
FIG. 1 shows a basic block diagram of a first embodiment of a high-voltage WLED boost converter.

FIG. 1 shows a basic block diagram of a first embodiment of a high-voltage WLED boost converter disclosed. The circuit of FIG. 1 comprises a string of external WLEDs 1 connected between an output voltage of a boost converter VBOOST and a node FBK, an external inductor L 2 connected between battery (VBAT) and node LX, an external Schottky diode SD 3 connected between LX and the boosted voltage VBOOST, an external capacitor Cout 4 connected to the boosted voltage VBOOST, an integrated power switch NFET device 5 controlled by the signal GATE, an integrated programmable current source IDAC 6 to bias the string of WLED 1, and an integrated regulation loop PWM_ctrl 7 with FBK (feedback) voltage as input and GATE signal as output. In the example of FIG. 1 a string of 4 WLEDs 1 is shown, it should be noted that the instant disclosure applies also to one WLED or any number of WLEDs.

The main principle of operation and how regulation is achieved via modulating the width of pulses at the GATE (PWM) are noted here:

To supply a string of e.g. 4 or more WLEDs, the VBOOST voltage needs to be regulated at values equal to VBOOST=4×Voltage_WLED+FBK>10V, hence the integrated parts of the circuits exposed to these levels need to be implemented with High Voltage (HV) devices.

The boost converter has two distinct modes of operation:
1. Discontinuous Conduction Mode (DCM), characterized by the current through the coil iL reaching zero when the NFET is off, unipolar diode current and average coil current iL_avg<iDAC;
2. Continuous Conduction Mode (CCM), characterized by iL always >0, bipolar diode current and average coil current iL_avg>iDAC.

Figure 2:
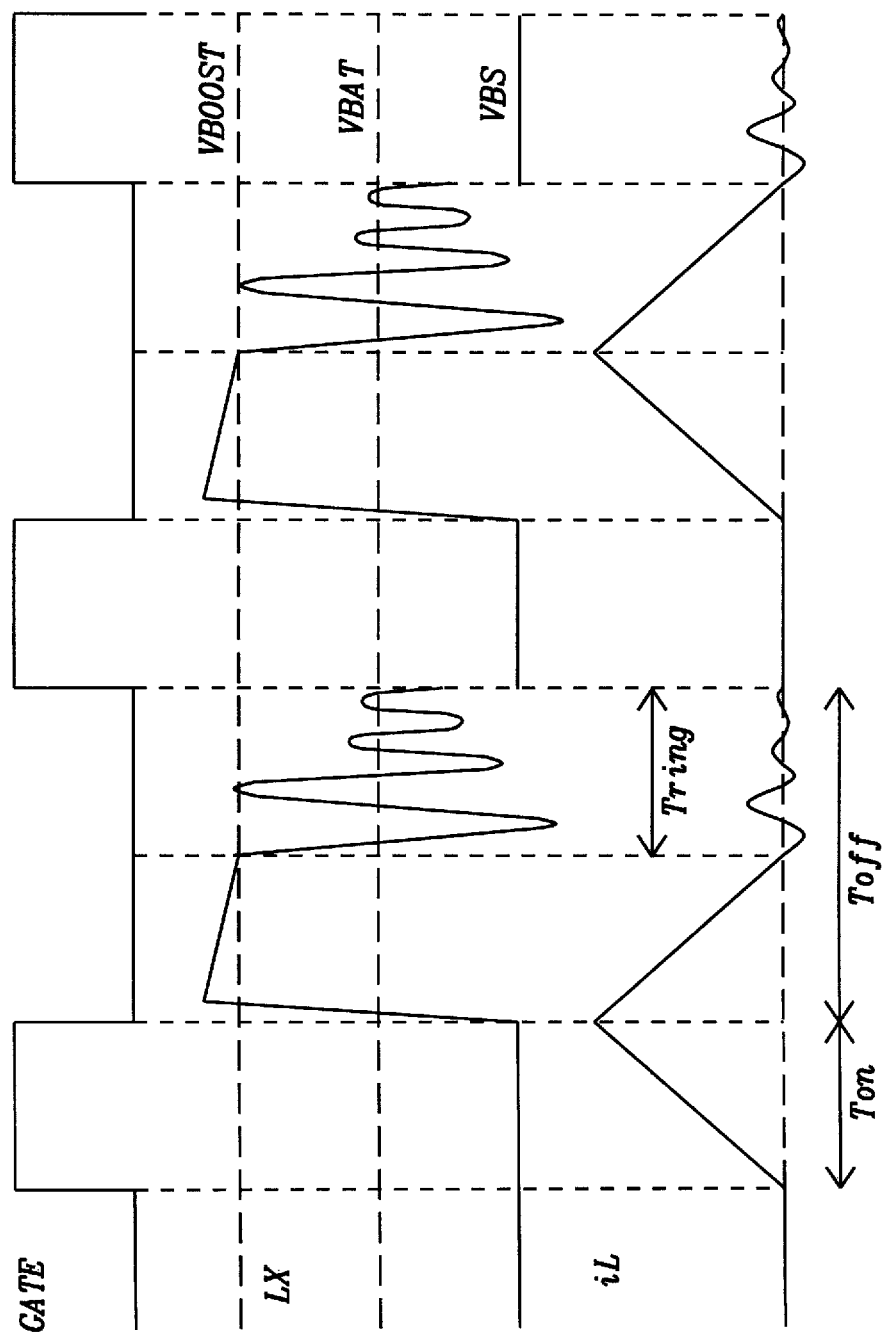
FIG. 2 shows the signals in the boost converter during DCM.

FIG. 2 shows the signals in the boost converter during DCM:

During Ton the NFET 5 is on and inductor L 2 is charged;

At the beginning of Toff, when the GATE signal turns off the NFET, the LX node flies above VBOOST and turn on the diode SD 3 allowing L 2 to discharge into capacitor Cout 4.

At the beginning of Tring, when iL reaches zero, the LX node starts to fall down. The inductance of L 2 and the total capacitance at the LX node form a resonator making the LX node to oscillate potentially below VSS and causing the bulk diode in the NFET to conduct and charge L 2. The ringing current iL during Tring is not transferred to WLED 1 but used to sustain the oscillation, which can hence be considered as dissipation.

Figure 3:
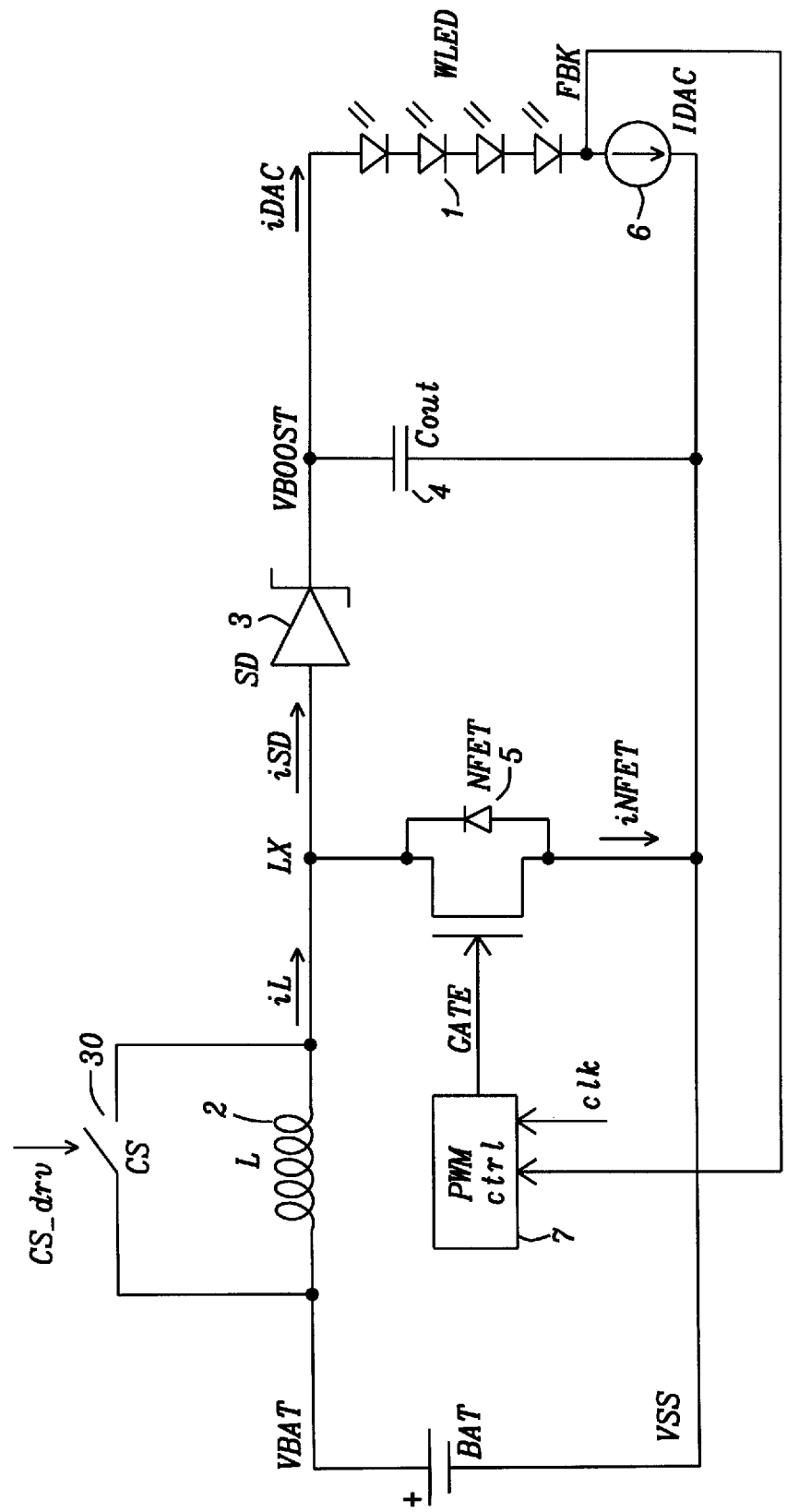
FIG. 3 HV WLED asynchronous boost converter with Coil Switch.

FIG. 3 shows the HV WLED asynchronous boost converter with a Coil Switch 30. To prevent the ringing, a common solution is to introduce a switch across the coil CS 30 between the nodes VBAT and LX to virtually dump the oscillator when Tring occurs, while it remains open when the NFET is on.

The complications that the present invention intends to address are the following:

The switching control signal CS_drv needs to be made available by design: in a synchronous boost converter the current sensing is not performed in the Toff phase (when the NFET is off) making the information of when iL reaches zero unavailable. A sensing of iL would require the use of an active device or resistor in series with L causing loss in efficiency equivalent to iL×Rsense;

The CS requires a fast turn on when the beginning Tring phase is detected: The LC constant can be quite small requiring a fast turn on of CS to stop the ringing: i.e. for L=10 μH, C at LX=10 pF, freq_LC~16 MHz;

CS has to stand HV conditions (>10V);

CS has to be a unipolar switch: during Ton no current must flow in CS, while during Tring CS has to be completely turned on. This represents a certain level of complication for the integrated technology in use for such WLED boost converter (HV BCD with enhancement C-MOS transistors).

Figure 4:
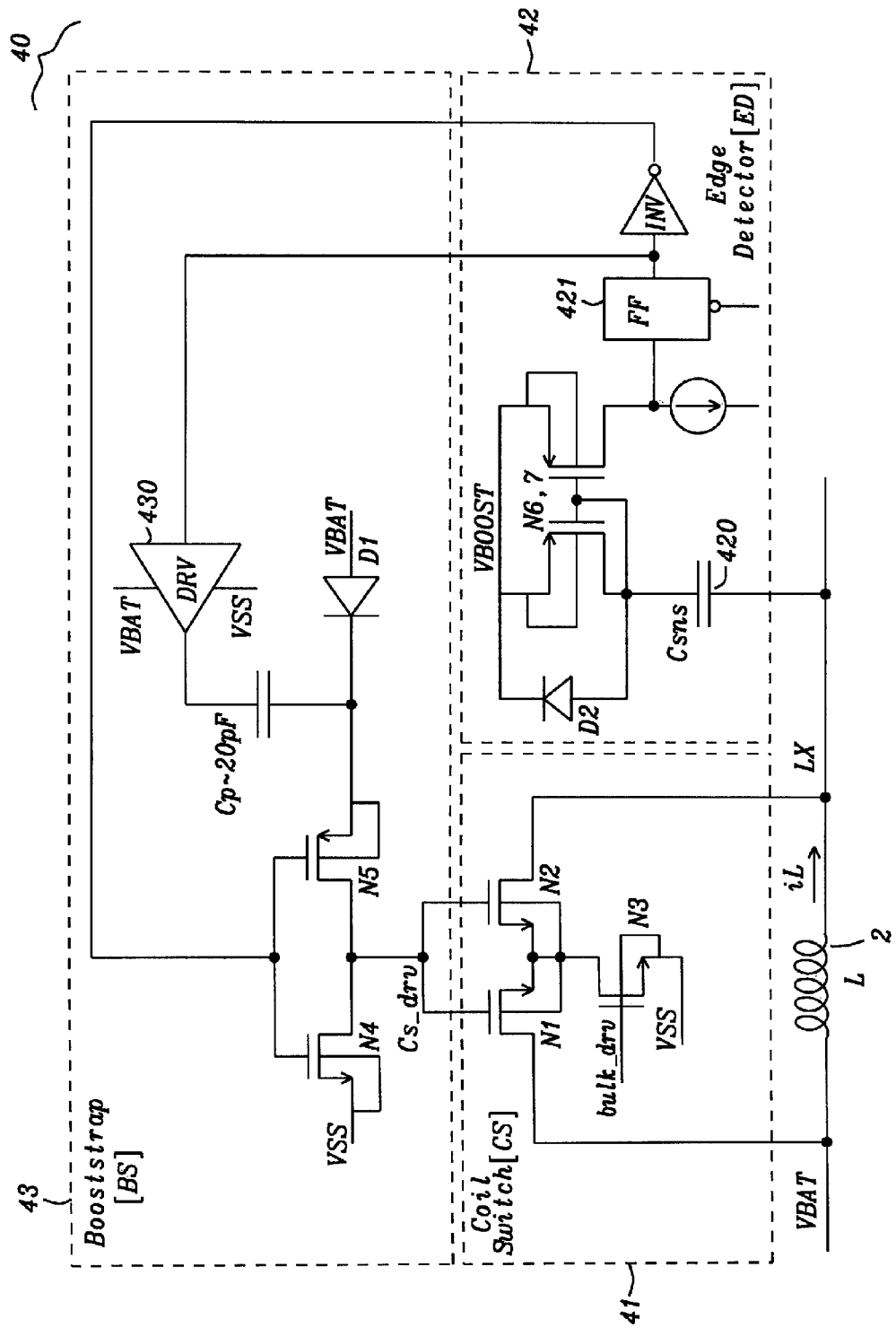
FIG. 4 depicts a coil switch system of the present disclosure.
Figure 5:
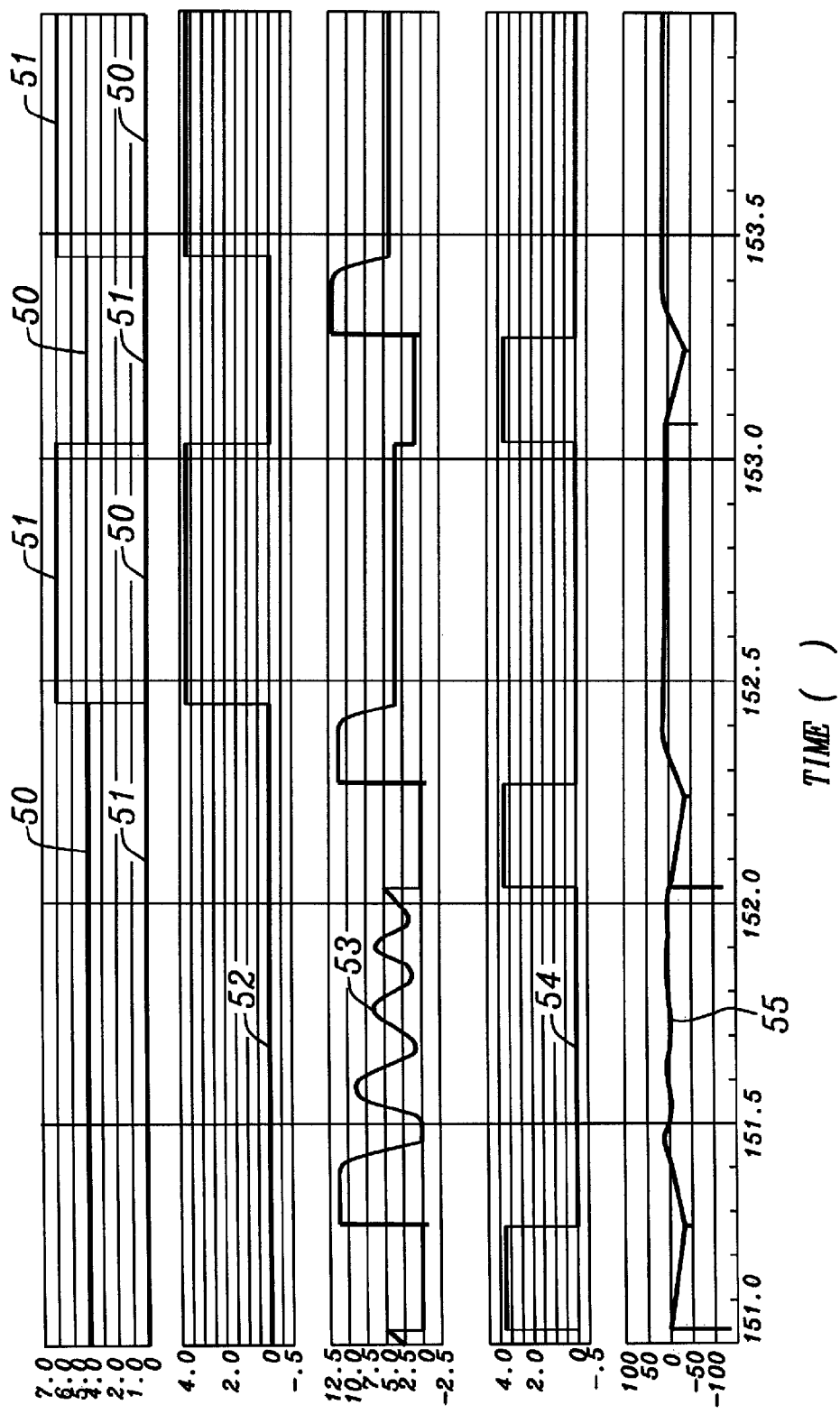
FIG. 5 illustrates simulation results of the circuit disclosed, showing a typical case at room temperature.

FIG. 4 depicts a coil switch system 40 of the present disclosure. The coil switch system 40 comprises of three units:

The Coil Switch (CS) 41;
The Edge Detector (ED) 42;
The Boost Strap (BS) 43;

The coil switch CS 41 comprises 2 identical HV enhancement NMOS devices (N1 and N2) sharing the bulk connected to NMOS device N3. This arrangement allows to:

Isolate VBAT from LX when CS 41 is off as the bulk diodes in N1 and N2 have the anodes not in series;

The bulk node is set to ground by N3 when CS 41 is off and is set approximately to VBAT when CS turns on. A non-overlapping circuit (not shown) will prevent cross conduction between VBAT and VSS or VBOOST and VSS during transitions;

The signal "bulk_drv" becomes high when the signal GATE (see FIG. 1) becomes high and becomes low as soon as the edge detector activates the Coil Switch (see FIG. 5). A dedicate control logic prevents bulk_drv to become high when the Coil Switch is still on, avoiding shorts between battery and ground.

The edge detector ED 42 comprises of a small capacitor Csns 420 connected between LX and a HV current mirror of PMOS devices N6-N7:

When CS 41 and NFET are both off (beginning of Toff), Csns 420 is charged to a voltage LX=VBOOST+V (SD3);

When LX falls down at the end of the discharging phase of inductor L 2 into capacitor Cout 4 (beginning of Tring), capacitor Csns 420 discharges from LX pushing a current into the current mirror N6-N7 and triggering flip-flop FF which is kept in reset during the Ton phase.

Diode D2 clamps the upper plate of capacitor Csns 420 slightly above VBOOST.

The boot-strap BS 43 comprises an integrated capacitor Cp:

When the coil switch CS is off capacitor Cp is charged to VBAT via diode D1 while the bottom plate of capacitor Cp is held to VSS by amplifier DRV 430. NMOS device N5 is on keeping the coil switch CS off and PMOS device N4 is off.

When CS is turned on, the bottom plate of capacitor Cp is charged to VBAT by amplifier DRV 430. N5 is off and N4 on. The charge accumulated in Cp in the Ton phase is reversed into the gate capacitance of CS to a value close to $2 \times \text{VBAT} - V_{diode}$ turning CS on.

The architecture presented has a very little DC operating current consumption (~15 µA typical) while during transients it is required to charge and discharge capacitor Cp in boot-strap circuit BS. While the boost is in CCM mode, the coil switch CS system can also be left activated as Cp will never perform the bootstrapping.

It should be noted that FIG. 4 illustrates some key points of the disclosure, namely:

A HV Coil Switch (CS), to short the coil of a boost converter when the current in it reaches zero during DCM, made of a series of 2 identical HV enhancement NMOS with bulk switch system;

a HV Edge Detector (ED) to sense the fast falling edge of the LX node;

a Boost Strap (BS) system to lift the gate of CS above the VBAT level and turn on CS;

Minimum DC current required to operate to minimize impacts on efficiency;

High Voltage (HV) devices are deployed to be compatible with the VBOOST levels; "middle voltage" is compatible with the Battery (VBAT) levels.

In FIG. 3 NFET 5 is HV;
In FIG. 4 N1, N2, N3, N4, N5, and N6 are HV.

FIG. 5 illustrates simulation results of the circuit disclosed, showing a typical case at room temperature. The final plot shows the simulated results with and without the CS activated.

From the top to bottom (see FIG. 4 and FIG. 5 for reference):

CS_drv 51 and bulk_drv 50;
ED output 52;
GATE 54
LX 53; and
IL. 55

It should be noted that the architecture disclosed is scalable for different values of the inductor L and ESR (Equivalent Series Resistance). The size of N1 and N2 would require to be scaled to reach the desired On-resistance and the Cp capacitor scaled to compensate for the increased/decreased value of gate capacitance of the coil switch CS.

It should also be noted that the coil switch, the edge detector, and the boot strap circuit disclosed here can be used together with the WLED driver as disclosed in the patent application titled "Method for Optimizing Efficiency versus Load Current in an Inductive Boost Converter for White LED Driving", Ser. No. 13/441,070 filing date Apr. 6, 2012, and with other WLED drivers. A combination of both patent applications would look like e.g. superimposing of FIG. 4 of the present patent application to FIG. 1 of the patent application European application number 12002094.6, filed Mar. 24, 2012. The Coil Switch system is supposed to be a further improvement to the efficiency of the system described in the patent application Ser. No. 13/441,070, but without interaction with the programmable windows. The activation of the Coil Switch (CS) in the backlight system will have a small effect in lowering the target regulated voltage at the node FBK hence if CS used, the tuning of the regulated voltage FBK has to be performed with CS on.

The CS can be used in any other backlight system without the improvements of the patent application Ser. No. 13/441,070, filed Apr. 6, 2012 in place, wherever the spurious ringing needs to be eliminated for efficiency purposes or reduce the electromagnetic disturbance (EMI)

Figure 6:
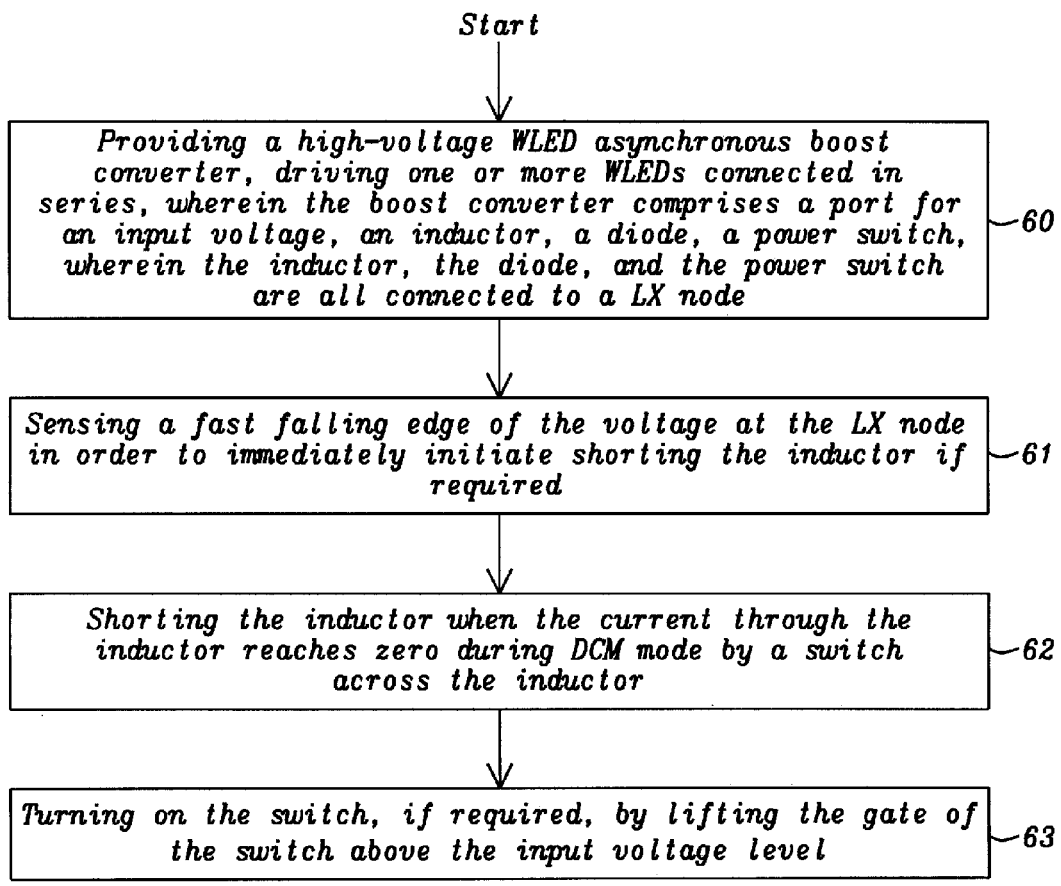
FIG. 6 illustrates a flowchart of a method disclosed to prevent ringing in Discontinuous Conduction Mode (DCM) of a boost converter for a white LED driver.

FIG. 6 illustrates a flowchart of a method disclosed to prevent ringing in Discontinuous Conduction Mode (DCM) of a boost converter for a white LED driver. Step 60 of the method of FIG. 6 illustrates the provision of a high-voltage WLED asynchronous boost converter, driving one or more WLEDs connected in series, wherein the boost converter comprises a port for an input voltage, an inductor, a diode, a power switch, wherein the inductor, the diode, and the power switch are all connected to a LX node. Step 61 depicts sensing a fast falling edge of the voltage at the LX node in order to immediately initiate shorting the inductor if required. Step 62 illustrates shorting the inductor when the current through the inductor reaches zero during DCM mode by a coil switch across the inductor. Step 63 illustrates turning on the switch, if required, by lifting the gate of the switch above the input voltage level.

While the disclosure has been particularly shown and described with reference to the preferred embodiments thereof, it will be understood by those skilled in the art that various changes in form and details may be made without departing from the spirit and scope of the disclosure.

What is claimed is:
1. A method to prevent ringing in Discontinuous Conduction Mode (DCM) of a boost converter for a white LED driver, comprising the following steps:
   (1) providing a high-voltage WLED asynchronous boost converter, driving one or more WLEDs connected in series, wherein the boost converter comprises a port for an input voltage, an inductor, a diode, a power switch, wherein the inductor, the diode, and the power switch are all connected to a LX node;
   (2) sensing a fast falling edge of the voltage at the LX node in order to immediately initiate shorting the inductor if required;
   (3) shorting the inductor when the current through the inductor reaches zero during DCM mode by a coil switch across the inductor, wherein the coil switch comprises two identical HV enhancement NMOS devices sharing a bulk, which is connected to an NMOS transistor N3; and
   (4) turning on the coil switch, if required, by lifting the gate of the coil switch above the input voltage level.

2. The method of claim 1 wherein said coil switch provides a short of the inductor when the coil switch is ON.

3. The method of claim 1 wherein the sensing of falling edge of the LX node is performed by an edge detector comprising a capacitor connected to the node LX, wherein said capacitor is charged to a voltage LX≥VBOOST when both the coil switch and the power switch are OFF.

4. The method of claim 1 wherein the turning ON the coil switch is performed by a boot-strap circuit comprising a capacitor Cp wherein the coil switch is turned ON by reversing a charge accumulated in capacitor Cp to a gate capacitance of the coil switch.

5. The method of claim 4 wherein, when the coil switch is OFF, the capacitor Cp is charged to the input voltage via an integrated diode while a bottom plate is held to VSS voltage by an integrated driver.

6. A circuit capable of preventing ringing in Discontinuous Conduction Mode (DCM) of a boost converter for a white LED driver, comprising:
   a boost converter comprising:
      a port for an input voltage;
      an inductor connected between a first terminal of the port for the input voltage and a node LX, wherein a high voltage coil switch circuit is capable of shorting the inductor when a current through the inductor reaches zero during DCM mode;
      said high voltage switch circuit being controlled by a boot strap circuit;
      a high voltage edge detector capable of sensing a fast falling edge of the voltage at a LX node in order to immediately initiate shorting the inductor via a boot strap circuit, if required, wherein the LX node connects a second terminal of the inductor, a first rectifying means, and a power switch, and wherein the edge detector is connected via a first and a second connection to the boot strap circuit;
      said boot strap circuit capable of lifting a gate of the high voltage switch circuit above a level of the input voltage and to turn on the coil switch;
      said first rectifying means connected between the node LX and an output voltage of the boost converter;
      a first capacitive means connected between output ports of the boost converter;
      said power switch connected between the node LX and VSS voltage, wherein the power switch is controlled by output signals of a PWM control unit; and
      said PWM control units capable of receiving inputs from a clock signal generator and from a voltage level from a node, connected between a second terminal of a programmable current source and a second terminal of one or more white LEDs connected in series;
   said one or more white LEDs, wherein a first terminal of the one or more white LEDs is connected to a first output port of the boost converter; and
   said programmable current source capable of delivering a bias current to the one or more white LEDs, wherein a first terminal of the current source is connected to VSS voltage.

7. The circuit of claim 6 wherein said rectifying means is a Schottky diode.

8. The circuit of claim 6 wherein said power switch is a NFET device.

9. The circuit of claim 6 wherein said coil switch circuit comprises:
   a first and second identical high voltage enhancement NMOS device, sharing a bulk, which is connected to a drain of a third NMOS device, wherein both gates are capable of receiving input from a connected together to the boot strap circuit, the drain of the first NMOS device is connected to the input voltage, both sources are connected together, and the drain of the second NMOS device is connected to the LX node; and
   said third NMOS device wherein the source is connected to VSS voltage and the gate is receiving a bulk_drv signal.

10. The circuit of claim 6 wherein said edge detector comprises:
   a sixth and a seventh NMOS device forming a current mirror, wherein both sources are connected to an output voltage of the boost converter, both gates and a drain of the fifth NMOS device are connected to a first terminal of a second capacitive means and to an anode of a second rectifying means, and the drain of the seventh transistor is connected to a first terminal of a current source and to a first terminal of a flip-flop;
   said second capacitive means, wherein its second terminal is connected to LX node;
   said second rectifying means wherein its cathode is connected to the output voltage of the boost converter;
   said current source, wherein its second terminal is connected to the LX node;
   said flip-flop, wherein a second terminal is connected to an input of an inverting amplifier and via the first connection to the bootstrap circuit; and
   said inverting amplifier wherein an output is connected via the second connection to the boot strap circuit.

11. The circuit of claim 6 wherein said boot strap circuit comprises:
   a driver amplifier, wherein an input is the second connection to edge detector circuit and an output is connected to a first terminal of third capacitive means;
   said third capacitive means, wherein a second terminal of the third capacitive means is connected to a cathode of a third rectifying means and to a bulk and to a source of a fourth PMOS transistor;
   said third rectifying means wherein its anode is connected to the input voltage;
   said fourth PMOS transistor, wherein a gate is connected to the second connection to the edge transistor and to a gate of a fifth NMOS transistor, and a drain is connected to a drain of the third transistor and is controlling the coil switch circuit; and said fifth NMOS transistor wherein a source and a bulk is connected to VSS voltage.

12. The circuit of claim 6 wherein said third capacitive means has an integrated capacitance of about 20 pF.

13. The circuit of claim 6 wherein said low voltage is in the order of magnitude of about 5V.

14. A method to optimize efficiency and to prevent ringing in Discontinuous Conduction Mode (DCM) of a boost converter for a white LED driver, comprising the following steps:
   (1) providing a device comprising an arrangement of one or more white LEDs in series, a programmable iDAC current source, a high-voltage WLED asynchronous boost converter, driving the one or more WLEDs, wherein the boost converter comprises a port for an input voltage, an inductor, a diode, a power switch, and a programmable reference voltage generator for an error amplifier stage, wherein the inductor, the diode, and the power switch are all connected to a LX node;
   (2) sensing a fast falling edge of the voltage at the LX node in order to immediately initiate shorting the inductor if required;
   (3) shorting the inductor when the current through the inductor reaches zero during DCM mode by a coil switch across the inductor, wherein the coil switch comprises two identical HV enhancement NMOS devices sharing a bulk, which is connected to an NMOS transistor N3; and
   (4) turning on the coil switch, if required, by lifting the gate of the coil switch above the input voltage level.

15. A circuit capable of preventing ringing of a white LED driver having optimized efficiency, comprising:
   a boost converter comprising:
      a port for an input voltage;
      an inductor connected between a first terminal of the port for the input voltage and a node LX, wherein a high voltage coil switch circuit is capable of shorting the inductor when a current through the inductor reaches zero during DCM mode;
   said high voltage switch circuit being controlled by a boot strap circuit;
   a high voltage edge detector capable of sensing a fast falling edge of the voltage at a LX node in order to immediately initiate shorting the inductor via a boot strap circuit, if required, wherein the LX node connects a second terminal of the inductor, a first rectifying means, and a power switch, and wherein the edge detector is connected via a first and a second connection to the boot strap circuit;
   said boot strap circuit capable of lifting a gate of the high voltage switch circuit above a level of the input voltage and to turning on the coil switch;
   a rectifying means connected between the node LX and an output voltage of the boost converter;
   a capacitor connected between output ports of the boost converter;
   said power switch connected between the node LX and a second terminal of a sense resistor, wherein the power switch is controlled by a signal from a regulation loop;
   said sense resistor, wherein a second terminal of the sense resistor is connected to a second terminal of said port for the input voltage; and
   said regulation loop connected between a second terminal of a programmable current source and a gate of said power switch;
   said one or more white LEDs connected in series wherein a first terminal of the one or more white LEDs is connected to a first output port of the boost converter and a second terminal of the one or more white LEDs is connected to the second terminal of the programmable current source; and
   said programmable current source capable of delivering a bias current to the one or more white LEDs, wherein a second terminal of the current source is connected to the second terminal of said port for the input voltage.

* * * * *